May 27, 1941.   O. J. SUNDSTRAND   2,243,228
BOOKKEEPING MACHINE
Filed May 31, 1933   8 Sheets-Sheet 1

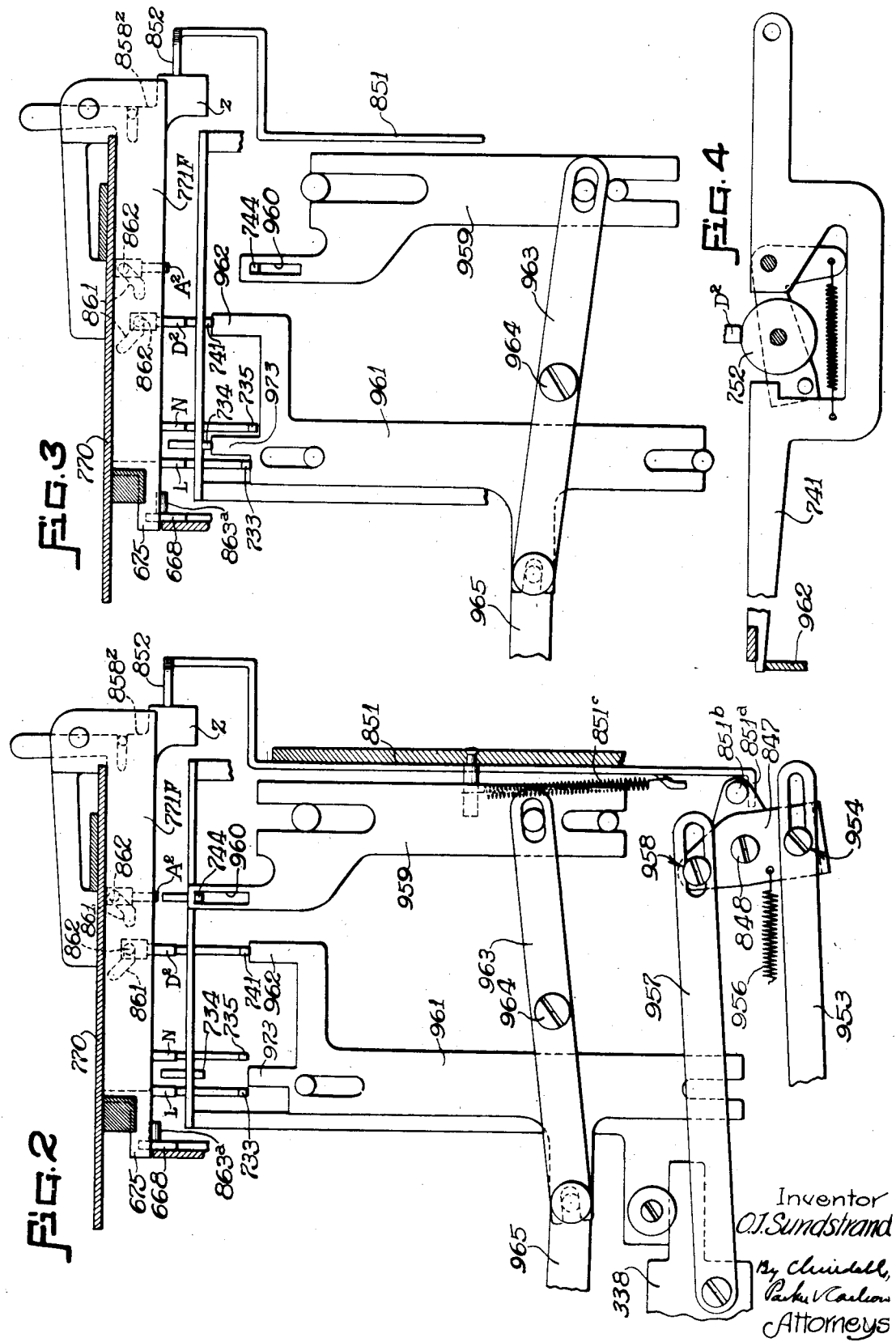

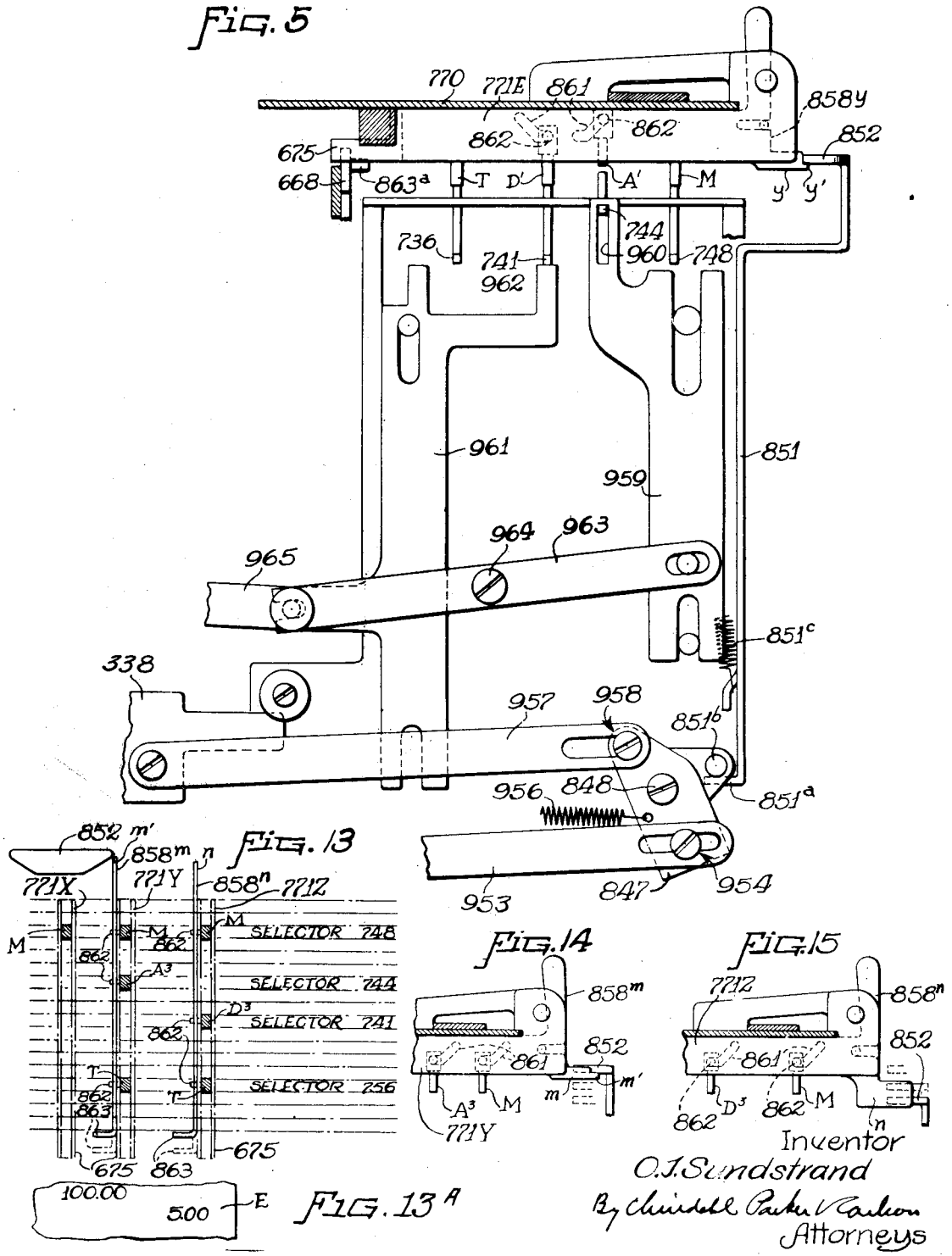

May 27, 1941.  O. J. SUNDSTRAND  2,243,228
BOOKKEEPING MACHINE
Filed May 31, 1933  8 Sheets-Sheet 4
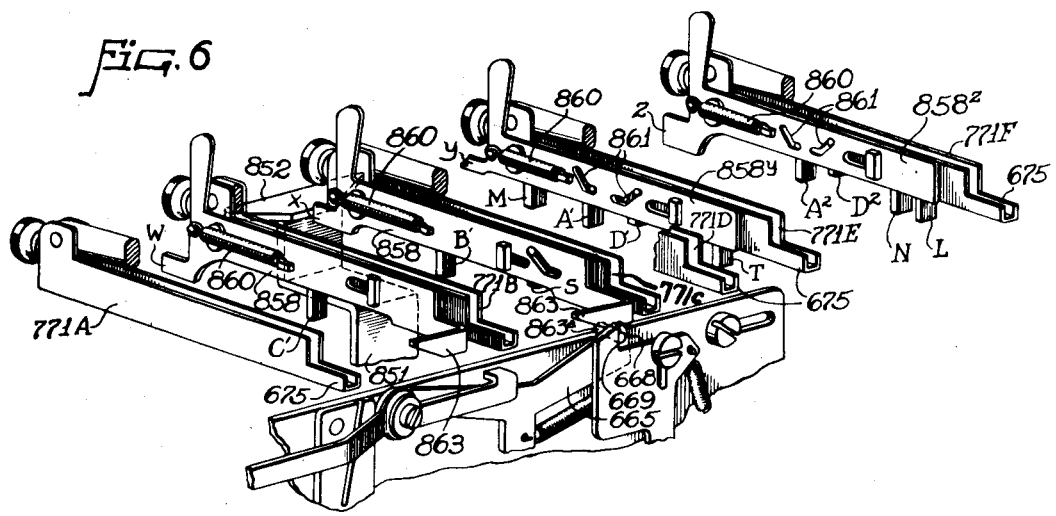
Fig. 6
Fig. 7 — CHARGE POSITION OF LEVER 950
Fig. 8 — CREDIT POSITION OF LEVER 950
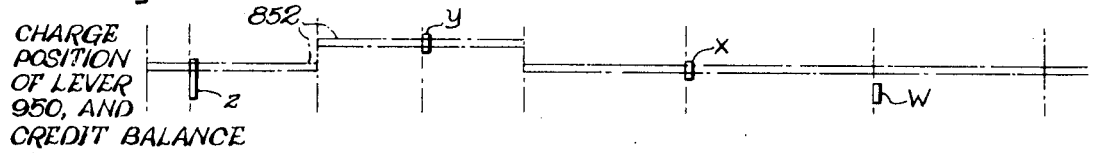
Fig. 9 — CHARGE POSITION OF LEVER 950, AND CREDIT BALANCE IN CROSSFOOTER
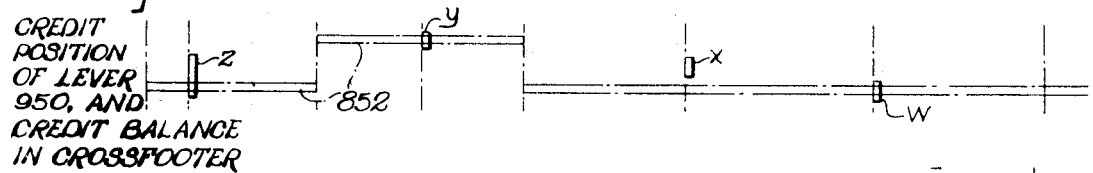
Fig. 10 — CREDIT POSITION OF LEVER 950, AND CREDIT BALANCE IN CROSSFOOTER
Inventor
O. J. Sundstrand
By Churchill Parker Carlson
Attorneys May 27, 1941.  O. J. SUNDSTRAND  2,243,228
BOOKKEEPING MACHINE
Filed May 31, 1933  8 Sheets-Sheet 5
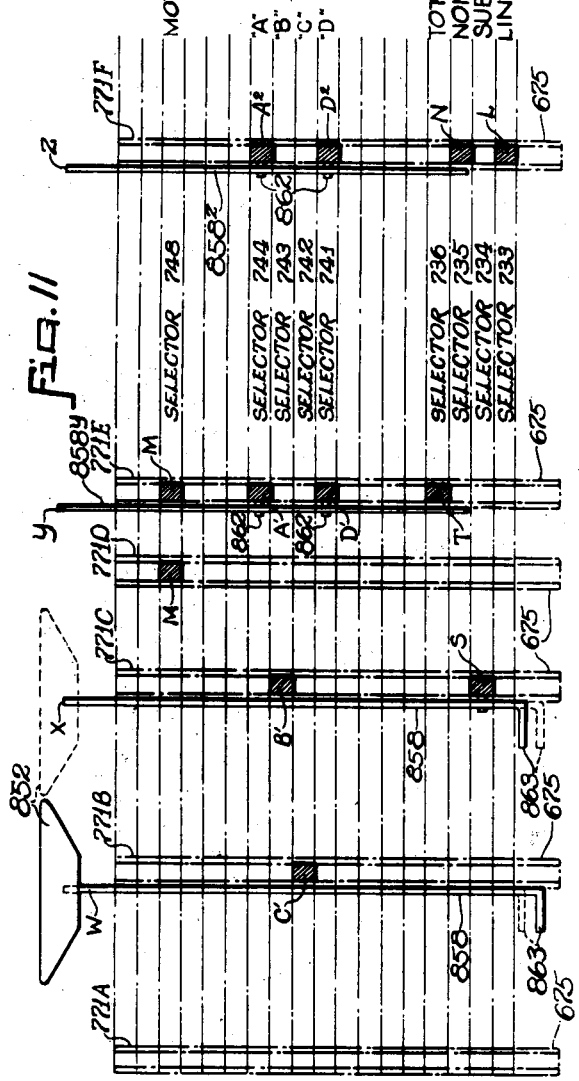
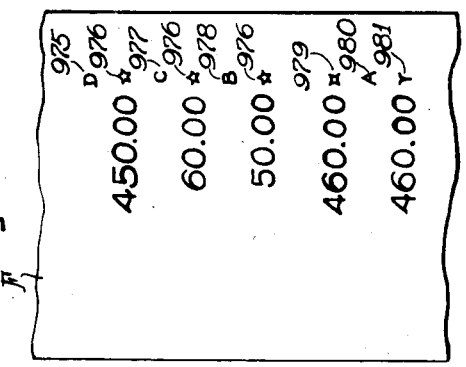
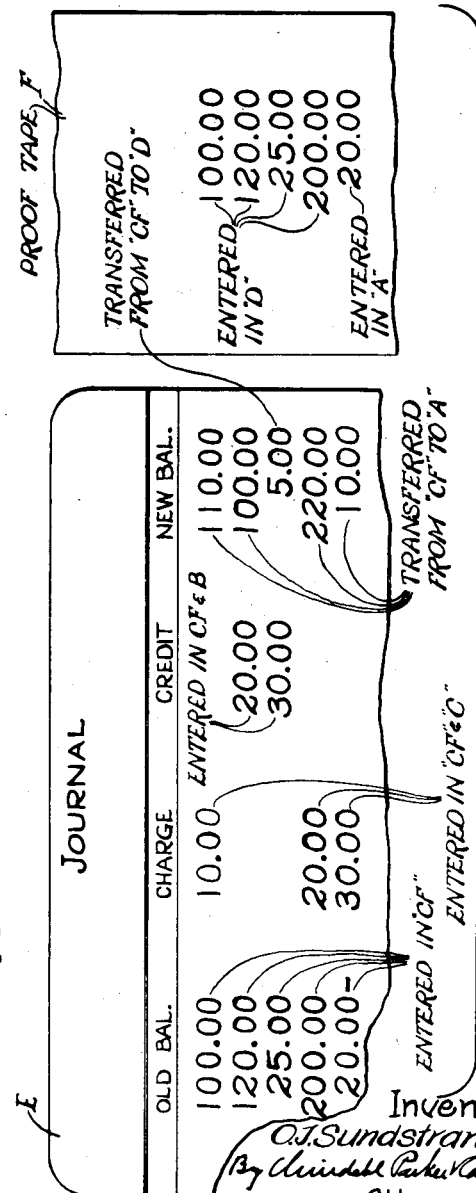
Inventor
O. J. Sundstrand
By Churchill Parker Carlson
Attorneys May 27, 1941.    O. J. SUNDSTRAND    2,243,228
BOOKKEEPING MACHINE
Filed May 31, 1933    8 Sheets-Sheet 6

INVENTOR
OSCAR J. SUNDSTRAND
BY
*R. G. Julihn*
ATTORNEY

May 27, 1941.　　　O. J. SUNDSTRAND　　　2,243,228
BOOKKEEPING MACHINE
Filed May 31, 1933　　　8 Sheets-Sheet 7

INVENTOR
OSCAR J. SUNDSTRAND
BY
ATTORNEY

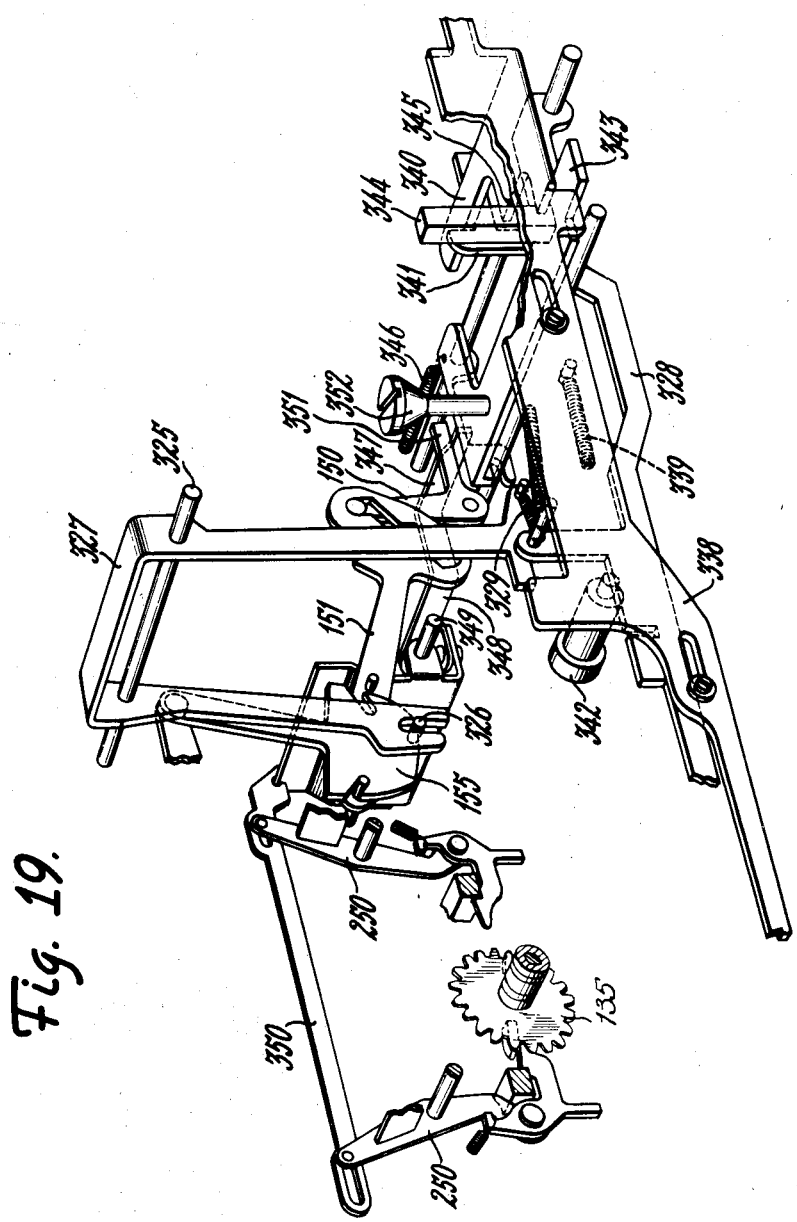

Patented May 27, 1941

2,243,228

UNITED STATES PATENT OFFICE 2,243,228

BOOKKEEPING MACHINE

Oscar J. Sundstrand, Rockford, Ill., assignor, by mesne assignments, to Underwood Elliott Fisher Company, New York, N. Y., a corporation of Delaware Application May 31, 1933, Serial No. 673,698

37 Claims. (Cl. 235—60)

This invention relates to bookkeeping machines, and particularly to a machine of that class embodying means whereby the machine may be "set up" or arranged to perform operations of predetermined character in the several columnar positions of the paper carriage.

More specifically, the invention relates to mechanism that facilitates proof of the accuracy of the posting.

A particular object of the invention is to provide means which is sensitive to the positive or negative character of an amount, for determining in which of two totalizers the amount shall be accumulated. In one of the embodiments, herein shown of the invention, said means is utilized to effect the accumulation of new debit balances in a certain totalizer and new credit balances in another totalizer, the selection of totalizers being automatically determined by the positive or negative character of the balance. Another object of the invention is to provide means sensitive to the positive or negative character of an amount in one of the totalizers of the machine, for determining which of a plurality of other totalizers shall be selected for operation under control of the laterally movable carriage.

Yet another object of the invention resides in the provision of a machine of the above character, including a plurality of totalizers, one of which is adapted for addition and subtraction, a laterally movable carriage normally effective to select said totalizers for operation in predetermined sequence, and means sensitive to the positive or negative character of the amount stored in said addition subtraction totalizer to cause said carriage to select said totalizers for operation in a different sequence.

The invention also has reference to a bookkeeping machine having manually operable means for changing from an adjustment suitable for the posting of debits to an adjustment adapted for the posting of credits. In the present embodiment of the invention, said means includes an adjustable cam. The automatic mechanism for selecting totalizers for the storage of new balances is herein arranged to utilize said cam, and to do so regardless of the position to which it may have been manually adjusted.

A further object is to provide improved means for manually adjusting the machine to determine whether addition or subtraction shall take place in the cross-footer or algebraic totalizer.

A further object is to provide manual means for adjusting the machine to determine whether old balances, when picked up the second time, shall be accumulated in one or another totalizer.

A further object is to utilize the same key for determining the character of the operation in the cross-footer and for selecting the totalizer in which the old balance is to be accumulated.

In the accompanying drawings, Figure 1 is a fragmentary vertical sectional view of one form of machine embodying the features of my invention. The machine is shown in normal position, i. e., that occupied at the end of a cycle of operations, the lever 950 being in position for the posting of credits.

Fig. 2 is a fragmentary side view of the rear portion of the machine, showing the carriage stops for the last columnar (or proof) position of the carriage, and illustrating the mechanism as adjusted to accumulate an old debit balance in the D totalizer.

Fig. 3 is a similar view, but showing the mechanism as adjusted by the key 967 to accumulate an old credit balance in the A totalizer.

In both Figs. 2 and 3, the cam 852 controlled by the lever 950 is in the charge-posting position.

Fig. 4 illustrates the D-totalizer selector in the ineffective position shown in Fig. 3.

Fig. 5 is similar to Figs. 2 and 3, but shows the carriage stops for the New Balance columnar position as automatically adjusted upon the occurrence of a new credit balance in the cross-footer.

Fig. 6 is a fragmentary perspective view of the stops on the paper carriage, showing also the escapement stops on the machine frame, and the cam 852.

Figs. 7, 8, 9 and 10 are diagrams indicating the coaction of the control elements with the cam 852 in all positions of the lever 950 and the slide 338.

Figs. 11 and 11A constitute a view illustrating a journal sheet and a proof tape, and showing diagrammatically the control plate on the paper carriage as set up for the performance of the operations shown on the journal sheet and proof tape.

Fig. 12 shows a fragment of the proof tape, with the proof printed thereon.

Figs. 13, 13A, 14 and 15 illustrate another embodiment of the invention, Figs. 13 and 13A being similar to Figs. 11 and 11A, and Figs. 14 and 15 being fragmentary views of two control elements.

Figure 16:
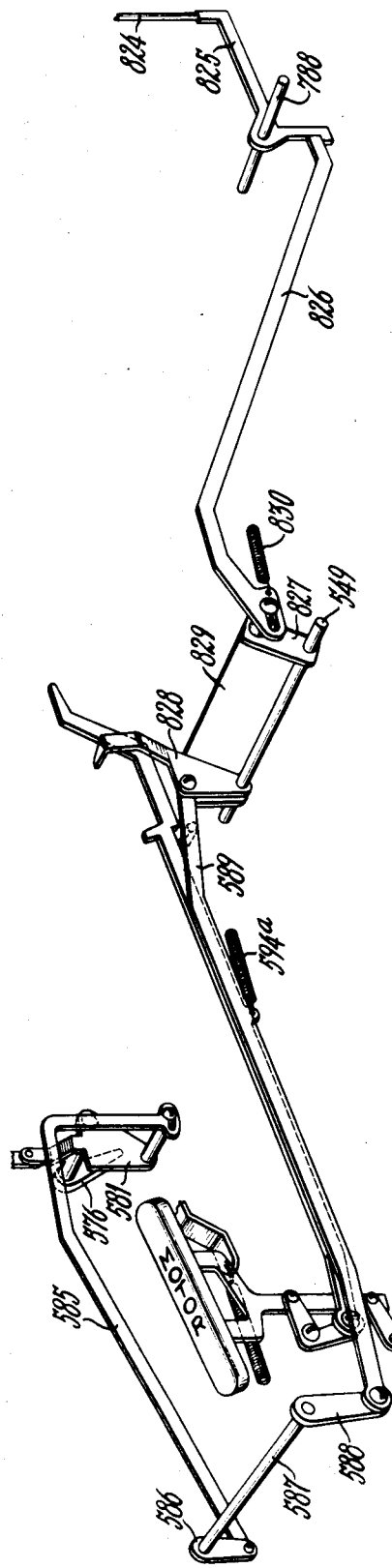

Figure 16 is a perspective view showing the train of elements for automatically releasing the drive clutch by movement of the traveling carriage.

Figure 17:
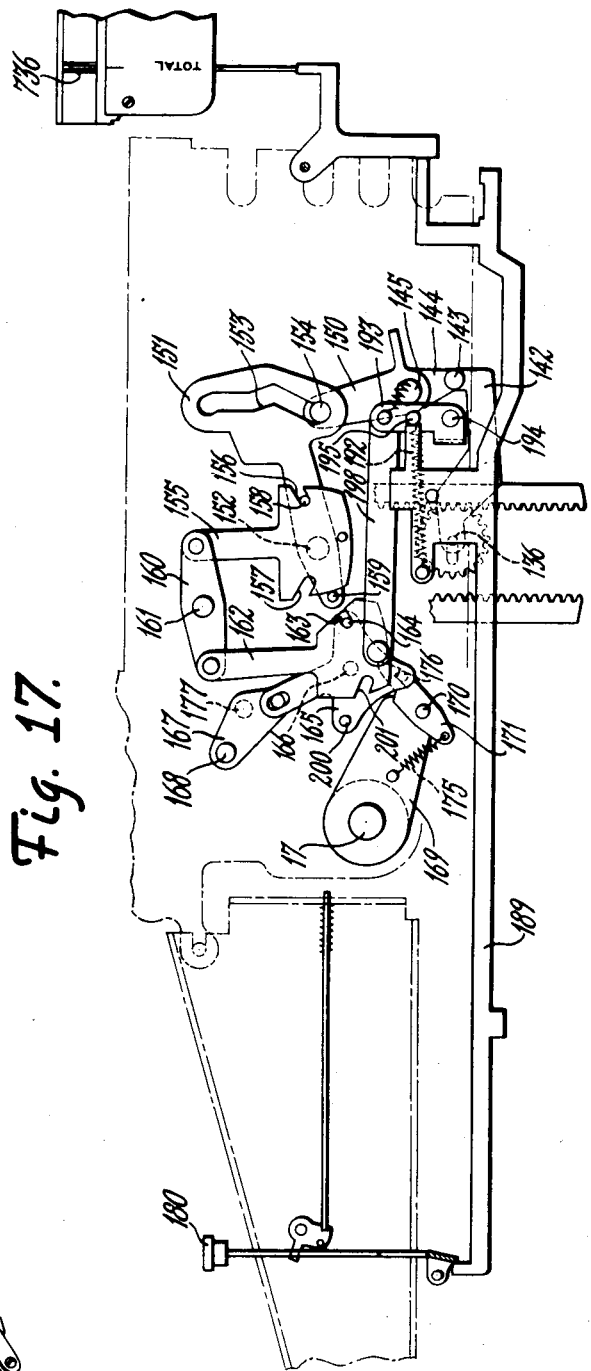

Figure 17 is a right side elevation showing the mechanism for engaging the crossfooter with the actuating racks, and the mechanism for changing the timing of the engaging mechanism for total taking operations.

Figure 18:
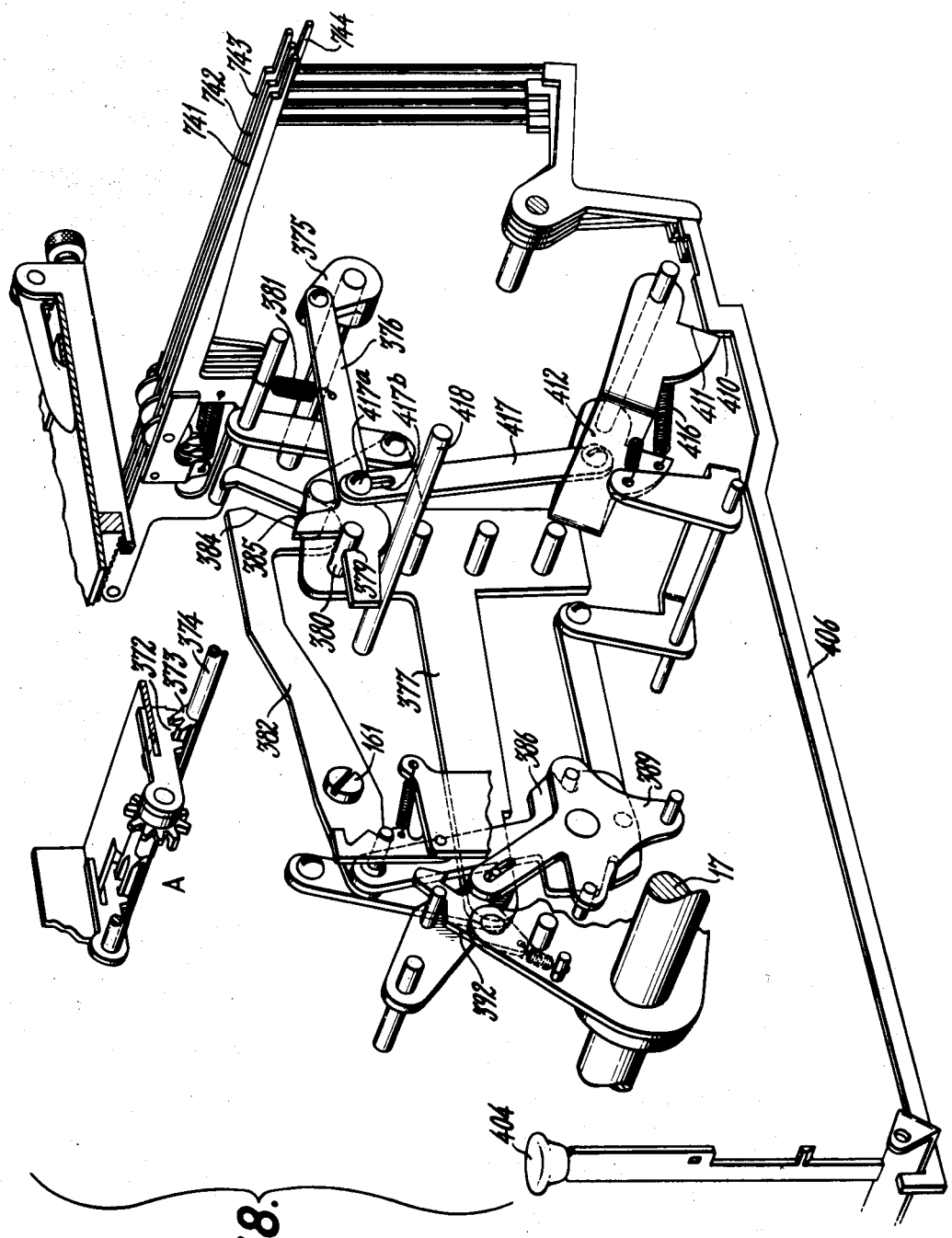

Figure 18 is a perspective view showing the means for selecting and engaging the rear adding totalizers.

Figure 19 is a perspective view showing the means for controlling the accumulating mechanism for subtraction, and the means for automatically conditioning the machine for the taking of a negative total.

The invention is herein shown as embodied in a machine of the type disclosed in my Patent No. 2,194,270, issued March 19, 1940, and in the British Patent No. 401,904, issued to William Warren Triggs, to which reference may be made for an understanding of features not fully described herein.

Using the reference numerals employed in said U. S. patent, 641 is the traveling paper carriage, 2 are the type bars or main actuators, 17 is the main rock shaft arranged to be oscillated manually or by an electric motor, 135 is the crossfooter (CF) or algebraic totalizer, 137 are the racks used in entering amounts additively into the cross-footer and in taking debit totals from the cross-footer and 138 are the racks provided for entering amounts subtractively into the cross-footer and in taking credit balances from the cross-footer.

When an item is to be added, the pinions 135 are moved into neutral position between the two sets of racks, before the actuators 2 are raised, and are moved rearwardly into mesh with the racks 137 just before the actuators 2 are moved downwardly. Addition, therefore, occurs on the down stroke of the racks 137, the extent of rotation of the pinions depending upon the extent of movement of the racks.

For subtraction by racks 138, the pinions are moved into mesh with these racks just before the latter descend. Subtraction, therefore, also takes place on the down stroke of the racks.

The upper ends of the racks are attached to rearwardly extending arms on the type bars so that operation of the general actuating mechanism to raise and lower the type bars raises and lowers the actuating racks.

The pinions 135 are moved into and out of mesh with the racks 137 and 138 by links 142, one of which is shown in Figure 17, the forward ends of the links having bearings to receive the ends of a totalizer supporting shaft 136. The rear ends of links 142 are pivoted at 143 to two arms 144 (only one of which is shown). Arms 144 are connected with each other for uniform movement about the center 145. An arm 150 also moves about center 145 and is connected with arms 144 to actuate the arms 144 upon movement of arm 150. Arm 150 is moved by a lever 151 pivoted at 152, said lever having a cam slot 153 therein to receive a stud 154 on the arm 150. The lower portion of the cam slot 153 imparts the engaging and disengaging movements required in adding and debit totaling operations, while the upper portion of the cam slot 153 produces the engaging and disengaging movements incident to subtracting and credit totaling operations.

The lever 151 is swung by means of a link 155 having notches 156 and 157 in its opposite edges. The notch 156 is adapted to receive a stud 158 on cam lever 151, and the notch 157 is adapted to receive a stud 159 on said lever. The studs 158 and 159 are at opposite sides of the pivot point 152, and hence, when link 155 is in engagement with pin 158, upward movement of link 155 will cause lever 151 to rise, placing stud 154 in the lower portion of cam slot 153, and when link 155 is in engagement with pin 159, lever 151 is lowered, placing pin 154 in the upper portion of cam slot 153.

Link 155 is pivoted to one end of a rocker arm 160 which is pivoted in the machine frame at 161. The other end of the rocker arm 160 is pivoted to a link 162 having a notch 163 adapted to receive a pin 164 on a lever 165. The last mentioned lever is pivoted on the center 166 and has a pin-and-slot connection with an arm 167 pivoted at 168. The means for swinging lever 165 includes an arm 169 secured to rock shaft 17. A pawl 171 is pivoted on arm 169 at 170. Pawl 171 is provided with two shoulders and a hook on its rear end. The pawl 171 is influenced by a spring 175. Lever 165 carries a pin 176 arranged to be engaged by the lower shoulder on pawl 171. Arm 167 carries a pin 177 arranged for engagement by the upper shoulder on pawl 171.

When the rock shaft 17 begins its initial movement in a cycle, arm 169 swings counterclockwise, causing the lower shoulder on pawl 171 to press against pin 176 and thereby rotate lever 165 counter-clockwise. This movement of lever 165 raises link 162 and lowers link 155, which in turn lowers lever 151 to its intermediate or neutral position. This places the pinions 135 in neutral position between the two sets of actuator racks at the very beginning of the machine cycle. The pinions are therefore out of mesh with the actuating racks before the latter begin to rise.

As the arm 169 completes its counter-clockwise movement, the upper shoulder on pawl 171 comes into engagement with pin 177 on arm 167. At the beginning of the return stroke of rock shaft 17, pawl 171 therefore presses against pin 177 and thereby rotates arm 167 counter-clockwise at the very beginning of the return stroke. This rotates lever 165 clockwise to engage the pinions 135 with the adding racks, so that during the return stroke of the actuating racks, the number indexed by the keyboard will be entered on the totalizer pinions.

If it is desired that the number set up by the amount keys be subtracted instead of added on the pinions 135, it is necessary to swing link 155 forwardly after lever 151 is moved to its intermediate position at the beginning of the cycle. This means includes the subtraction slide 328 (Figure 19) that is moved forwardly in the machine either by the depression of a key on the keyboard or by operation of the subtraction carriage control. Forward movement of this slide before the machine begins its cycle stretches a spring 329. This puts a forward tension on a bail 327 pivoted on a rod 325 and connected to link 155 by a pin 326. Because of the tension of spring 329, as soon as lever 151 is moved to its intermediate position, link 155 snaps forwardly, engaging pin 159 with notch 157 and disengaging pin 158 from notch 156. Therefore, at the beginning of the return stroke of the machine, when link 155 is raised, lever 151 is lowered instead of raised, placing the upper portion of cam slot 153 in engagement with pin 154. This moves the totalizer pinions 135 into engagement with racks 138 for subtraction.

This mechanism is fully disclosed in the above mentioned patents.

When a debit or positive total is to be printed, the pinions are retained in engagement with the racks 137 during the upward movement thereof. It is therefore necessary to prevent lever 165 from raising link 162 at the beginning of the operation. This means will now be described.

A total key 180 and a corresponding carriage control selector 736 are connected with a total slide 189 so that operation of either the key or the selector causes forward movement of the slide. On the slide 189 is an upstanding portion which is yieldingly connected through a spring 192 to an arm 193 pivoted in the machine frame at 194. The spring 192 normally holds a pin 195 on the arm 193 against a portion of the total slide 189. Arm 193 is connected with a link 198, which in turn is connected with the lower end of link 162. It will be seen that forward movement of the total slide 189 causes forward movement of link 162, withdrawing the notch 163 from pin 164 and placing the forward edge of link 162 against a pin 200 on lever 165, the spring 192 yielding toward the end of the movement of total slide 189 to permit the slide 189 to complete its movement. In the ensuing cycle arm 169 swings upwardly, swinging lever 165 counter-clockwise idly. Therefore the totalizer pinions remain engaged with the actuating racks as the latter rise. As lever 165 completes its counter-clockwise movement, pin 200 moves opposite a notch 201 in link 162, whereupon spring 192 moves the notch into engagement with the pinion. When lever 169 starts its return stroke, lever 165 is moved clockwise as in accumulating operations, thereby raising link 162 and causing the pinions 135 to be withdrawn from the actuating racks before the latter descend, thereby leaving the pinions standing at zero.

Since the totalizer wheels remain engaged with the actuating racks during the first half of the cycle, type bars 2 were raised differentially under control of the totalizer pinions 135, the latter being stopped by their transfer teeth when they reached zero in the customary manner. Therefore, when the printing hammers were fired in the customary manner at the beginning of the return stroke, the total standing on the totalizer wheels 135 was printed on the paper.

When there is a credit or negative total in the crossfooter and said total is to be printed, it is necessary that the pinions 135 be engaged with the subtracting racks 138 instead of the adding racks 137. A means for automatically engaging the pinions with the subtracting racks by employing a blank cycle is provided in the machine, and is controlled by the wheel of highest order in the crossfooter. This means will now be explained.

A slide 338 (Figures 1 and 19) is guided for forward and rearward sliding movement in the machine, said slide being impelled forward by a spring 339. On the rear end of slide 338 is a lug 340 (Figure 19) arranged to engage an upstanding lug 341 on the subtraction slide 328 for the purpose of pushing the subtraction slide forward into effective position. After each operation of the slide 338 it is restored to its normal rear position by a cam 280 (Figure 1) on the main rock shaft 17, said cam engaging a roller stud 342 on the slide 338 near the end of the return stroke of the rock shaft. The slide 338 is prevented from operating to push the subtraction slide 328 into effective position except when there is a credit balance or overdraft in the machine. A slide 343, movable transversely of the machine, carries a locking stud 344 arranged to lie in the path of a shoulder 345 on the slide 338 to prevent said slide from moving to its effective position under the influence of spring 339. A spring 346 connected to the slide 343 tends to move the latter to the left to place the stud 344 out of the path of the shoulder 345.

When there is a debit balance in the machine, the slide 343 is prevented from moving under the influence of its spring 346 to release the slide 338, by means of a stop arm 347 fixed to one arm of a bell crank 348 pivoted on the axis 349. The other arm of the bell crank 348 is arranged to be moved by either one of two levers 250. A link 350 has a pin-and-slot connection with both of the levers 250 and is loosely connected to the upper end of the bell crank 348 as shown in Figure 19. When the crossfooter passes from the positive to the negative side of zero, the arm 250, shown at the left in Figure 19, is released by the highest order wheel of the totalizer in the customary manner, and pushes the link 350 toward the right, rocking the bell crank in the direction to lower the stop arm 347 out of the path of the slide 343; and when the crossfooter passes through zero in the opposite direction, the lever 250, shown at the right, pushes the link 350 toward the left to place the stop arm 347 in the path of the slide 343. Thus, when there is a positive or debit balance in the machine, the slide 343 is held by the stop 347 in position to prevent the slide 338 from conditioning the crossfooter for a negative operation, and when there is a credit balance in the machine, the slide 343 is permitted to be moved by the spring 346 to the left so as to free the slide 338 for operation on the subtraction slide 328. The slide 343 is moved to the right into a position where it can be held by the stop arm 347 by an arm 351 fixed to arm 150 and arranged to operate against a cam surface 352 on a pin extending upwardly from slide 343. Whenever addition occurs, lever 151 is raised to its upper extremity, as exxplained above, rotating arms 150 and 351 counter-clockwise. This movement is sufficient to cause arm 351 to operate against the cam surface 352 and move slide 343 to the right the desired amount.

By the above described mechanism, when there is a credit balance in the crossfooter and it is desired to take a total, the customary blank cycle is first taken. During this cycle the slide 338 moves forward, bringing with it the subtraction slide 328. This causes the crossfooter pinions 135 to be left engaged with the subtraction racks 138 at the end of the blank cycle. Total taking is then performed during the next cycle.

Figure 1:
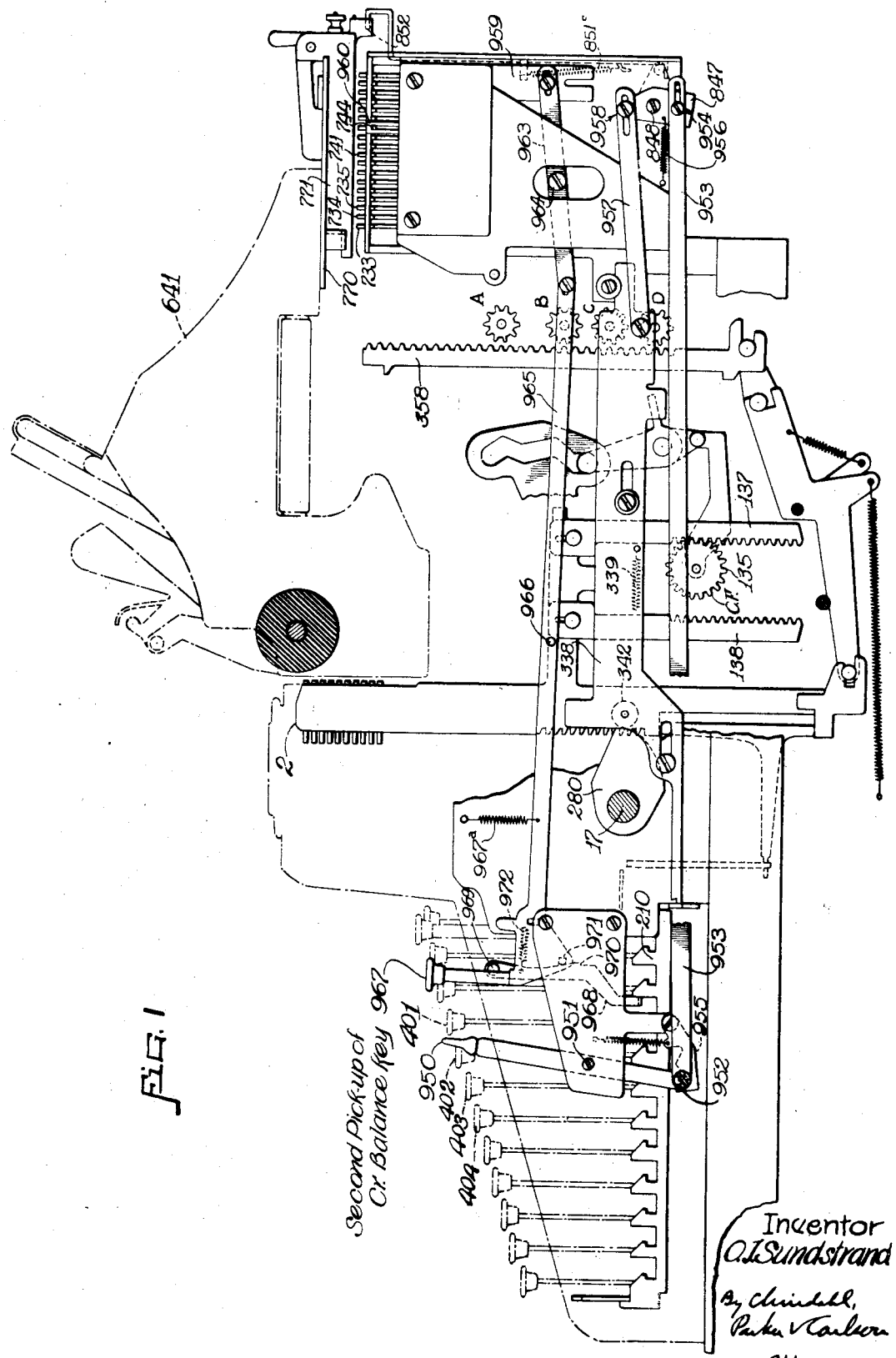

A, B, C and D are rear or auxiliary totalizers. 358 are actuating racks for operating these totalizers, the racks being connected for movement with, but in opposite direction to type bars 2, as may be seen in Figure 1. These totalizers normally lie disengaged from their actuating racks 358 and are selected individually for engagement and actuation during the machine cycles. The means for selecting these totalizers includes four keys 401, 402, 403 and 404 (Figure 1) and four carriage selectors 741, 742, 743 and 744 (Figure 18). The means for selecting the different totalizers by operation of the keys or carriage selectors, together with the means for engaging the selected totalizers, are similar for each of the totalizers. It will therefore be necessary to describe only the means for selecting one of the totalizers. In Figure 18 the means for selecting and engaging the A totalizer is illustrated and will now be described.

Depression of key 404 or carriage selector 744 moves a slide 406 forward. Slide 406 has a shoulder 410 which bears against a lug 411 on a bail 412. A spring 416 tends to swing bail 412 downwardly and move slide 406 rearwardly. Bail 412 is connected to a link 376 through a link 417, there being a pin-and-slot connection 417ª, 417ᵇ between these two parts. Depression of key 404 or selector 744 raises link 417 so that link 376 may be raised by a spring 381 connected to it, to engage notch 379 in its forward end with a pin 380 on a slide 377 when slide 377 operates during the cycle. Normally a pin 418 lies directly in front of link 376 to hold the A register disengaged, but when slide 406 is moved forward preparatory to a machine cycle and slide 377 is moved rearwardly during the first part of a cycle, spring 381 raises link 376, engaging notch 379 with pin 380 and raising the forward end of link 376 above pin 418.

Movement of slide 377 forwardly at the beginning of the second half of the cycle will then pull link 376 forwardly, and through arm 375, shaft 374, segment 373 and rack 372, engage the A totalizer with the actuating racks 358. The totalizer then remains engaged with the racks for the remainder of the cycle. The totalizer is disengaged at the very beginning of the next cycle, when slide 377 is moved to the rear, in the event that key 404 or selector 744 is not again depressed to select the A totalizer for this next cycle.

The means for moving slide 377 rearwardly at the beginning of a cycle and forwardly at the beginning of the second half of the cycle includes a lever 382 pivoted at 161 and having a cam slot 384 in its rear end embracing a pin 385 on slide 377. Lever 382 is lowered and raised during the machine cycle by the raising and lowering of a link 386 by a lever 389. Link 386 and lever 389 are operated from the main actuating shaft 17 by pawl 392 similarly to the operation of link 162 and lever 165 by pawl 171 in Figure 17.

This mechanism is fully disclosed in the above mentioned patents.

Selectors 733, 734, 735, etc., are operated by stops A', A², B', C', etc., variously adjustable on the control plate 770 of the paper carriage. The selector 733 enables the line-space mechanism. The selector 734 conditions the machine to effect subtraction in the cross-footer. The selector 735 conditions the machine to effect non-addition in the cross-footer, and selector 736 (Fig. 5) conditions the machine for the taking of a final total from the cross-footer.

The selector 748 (Fig. 5) causes the driving clutch to be thrown in. This is accomplished by having selectors 748 (Figure 5) depress a pin 824 (Figure 16). Said pin is supported by the rearwardly extending arm of a bell crank 825 pivoted at 788. The downwardly extending arm of said bell crank is arranged to push forward a link 826 which has a pin-and-slot connection with an arm 827. The latter is pivoted on the axis 549 and is connected to an arm 828 by a transverse web 829. Arm 828 is pivoted to the rear end of a link 589. A spring 830 is provided to tension the link 826 rearwardly. At points on the control plate 770 corresponding to columnar positions in which the machine is to be cycled, there are stop lugs M which serve to depress the selector 748 and thus swing the arm 828 forward. This moves link 589 forward, and through arm 588, rod 587, arm 586, link 585 and arm 581, moves a clutch detent 576 forward to release the machine for a cycle of operation. A spring 594ª normally holds the detent 576 in effective position.

This mechanism, together with the customary clutch and motor drive, are fully disclosed in the above mentioned patents.

The selector 741 is illustrated in Fig. 4. As shown in Fig. 4, the selector 741 comprises a roller 752 which is yieldingly supported, but which yields to the pressure of the stops D², etc., on the control plate 770 only when the left end of the selector is held up by some means such as lug 962. The other selectors are like the selector 741, except that in the case of the subtraction selector 734 and the motor repeat selector 748, the roller 752 is replaced with a device which prevents the selector from being depressed in the return travel of the carriage, as explained in the above mentioned patents.

The D totalizer is used for accumulating old debit balances when picked up the second time for proof purposes, the C totalizer for accumulating charges (i. e. debits), the B totalizer for accumulating credits, and the A totalizer for accumulating new debit balances. When a new credit balance occurs, it is accumulated in the D totalizer; and when an old credit balance is picked up the second time for proof purposes it is accumulated in the A totalizer.

Referring now to Fig. 11, which represents one of many possible practical applications of my invention: E is the journal or audit sheet produced as a carbon copy of the entries posted to a succession of ledger sheets (not shown). F is the proof tape. The upper portion of the diagram indicates the arrangement of stops A', B', C', etc. on the control plate 770 required to produce the operations represented upon the record material. Fig. 11 illustrates six control elements 771A, 771B, 771C, 771D, 771E and 771F, one for each of the columnar positions shown on the work-pieces E and F, together with one control element (771D) for the blank or spacing-cycle position just prior to the new balance position. These six control elements are also shown in Fig. 6. Each control element is in the form of an elongated holder or channel for stops, and is made of sheet metal bent to provide two vertical walls and a bottom connecting wall. The inner reduced end of each control element constitutes a locking projection 675, arranged to coact with escapement teeth 668 and 669, as described in said U. S. patent. The tooth 668 is formed on a lever 665.

The control element 771B in the "charge" columnar position carries a stop C' (Figs. 6 and 11) which depresses the selector 742 to cause the C totalizer to be used in that position.

The control element 771C in the "Credit" columnar position has a stop B' (Figs. 6 and 11) that depresses the selector 743 to bring the B totalizer into use in that column.

When a charge is to be posted to a ledger account, as in the case of the first entry on the journal sheet E, there is no occasion for the paper carriage to stop in the "Credit" column, hence manually operable means is provided to cause the carriage to "skip" that column, that is to say, pass from the "Charge" column to the spacing stroke position without pausing in the "Credit" column. Similarly, when a credit is to be posted, the carriage need not stop in the "Charge" column, hence, manually operable means is provided for causing the carriage to skip the "Charge" column and pass directly from the "Old Balance" column to the "Credit" column.

As hereinbefore stated, when the new balance is a debit amount, it is to be transferred from the cross-footer to the A totalizer, but when the new balance is a credit amount, it is to be transferred from the cross-footer to the D totalizer. Means is, therefore, provided for automatically adjusting the stops carried by the control element 771E in the "New Balance" position so as to transfer amounts to the A totalizer or the D totalizer in accordance with the character of the total to be transferred.

The manual means for skipping the "Charge" column or the "Credit" column, as the case may be, and the automatic means for determining whether the new balance shall be transferred to the D totalizer or the A totalizer, comprises a cam 852 (Fig. 2) carried on the upper end of a slide 851 mounted on the rear end of the machine for vertical movement. On the lower end of the slide 851 is a lug 851ª that underlies a part 851ᵇ on a bail 847 pivoted in the machine frame on the axis 848. A spring 851ᶜ attached to the slide 851 and anchored to a stationary part, tends to raise said slide. 950 (Fig. 1) is a hand lever pivoted at the right-hand side of the keyboard to swing on the axis 951. The lower arm of the lever 950 is pivoted at 952 to a link 953 which has a pin-and-slot connection 954 with the bail 847. A spring-actuated detent 955 engaging the inner end of the pivot 952, serves to hold the hand lever 950 in either of two positions, the forward position being that used when posting charges and the rear position (as shown in Fig. 1) when posting credits. A spring 956 (Fig. 2) connected to the bail 847 and anchored to a stationary part, normally holds the cam 852 in the position determined by the lever 950 and detent 955. The spring 956 is stronger than the spring 851ᶜ. By adjusting the lever 950 to the desired position, the cam 852 may be placed in position to coact with means on the control plate 770 to effect column skipping. This means will now be described.

On the side of each of the control elements 771B and 771C for the "Charge" and "Credit" columnar positions, respectively, is mounted a slide 858 (Fig. 6), as described in said U. S. patent, a spring 860 normally holding the slide in its rearward position. On the inner end of the slide is a cam 863 adapted, when the slide is in its forward position, to engage a pin 863ª (Figs. 2 and 6) on the spring-pressed lever 665, on which the locking tooth 668 is formed, and thus rock the lever to depress the tooth 668 below the path of the locking projection 675, thereby preventing the carriage from being arrested in that particular columnar position, and permitting the carriage to continue moving on to the next position. On the rear end of each of said slides is a lug to engage the cam 852, the lug on the slide in the "Charge" columnar position being designated $w$ on the drawings, and the corresponding lug in the "Credit" columnar position being marked $x$. As shown in the diagrams, Figs. 7, 8, 9 and 10, the lugs $w$ and $x$ are at different heights. When the hand lever 950 is in the forward, "Debit" or "Charge" position, the path of relative movement of the cam 852 is as shown in dot and dash lines in Fig. 7, the cam lying above the path of the lug $w$, traveling with the carriage, so as not to actuate the "Charge" skip cam 863, but lying in the path of the lug $x$ so as to cause skipping of the "Credit" column past the printing point. When the hand lever 950 is in the rear or "Credit" position (as in Fig. 1), the path of relative movement of the cam 852 and the lugs is that shown in Fig. 8, wherein the lug $w$ wipes past the cam 852 to produce skipping of the "Charge" column, and fails to act upon the lug $x$.

The means whereby the "New Balance," when negative in nature, is automatically transferred to the D totalizer instead of the A totalizer will now be described. The control element 771E, (Figs. 5 and 6), which is located on the control plate in the position corresponding to the "New Balance" position, has a stop A' which is normally down in position to depress the A totalizer selector 744, but which may be raised into ineffective position. Said control element also has a stop D' which is normally in ineffective position, but which may be lowered into position to depress the D totalizer selector 741. The stops A' and D' are raised and lowered by means of a cam slide 858ʸ mounted on one side of the control element for reciprocation longitudinally of said element, as explained in said U. S. patent. The slide 858ʸ has two cam slots 861 into which extend studs 862 which are rigid with the stops A' and D'. A spring 860 normally holds the slide in its rear position. On the rear end of the slide 858ʸ is a lug $y$ for engagement with the cam 852. As shown in Figs. 7 and 8, the lug $y$ is at such a height as normally to travel above the cam 852. When, however, the cross-footer contains a negative balance, the cam 852 is automatically raised into position to be engaged by the lug $y$ as the carriage is moving into the "New Balance" position. The means for thus raising the cam 852 comprises the slide 338 (Figs. 1 and 5). In order that the forward movement of the slide 338 shall also serve to raise the cam 852 into position to engage the lug $y$ just before the carriage 641 arrives in position for the printing of the new balance, I provide a link 957 which is pivoted to the rear portion of the slide 338 and which has a pin-and-slot connection 958 with the bail 847. The springs 339 and 851C are stronger than the spring 956.

When the lug $y$ engages the cam 852, the slide 858ʸ is pushed forwardly to lift the stop A' and lower the stop D', as shown in Fig. 5, so that as the carriage reaches the New Balance position, the stop D' depresses the selector 741 and thus conditions the machine to place the D totalizer in use in the ensuing cycle of operations.

As the cycle is being completed the cam 280 (Fig. 1) restores the slide 338 to its normal rear position, but the stops A' and D' are maintained in their adjusted positions as long as necessary by reason of the fact that the cam 852 is maintained up in engagement with the lug $y$ through the action of a latching projection $y'$ (Fig. 5) on said lug underlying the cam 852 until the carriage escapes to the next (the sixth) columnar position, the pin-and-slot connection 958 permitting such relative movement between the slide 338 and the cam 852, as will be understood from Fig. 2. When in the travel of the carriage to the sixth columnar position the lug $y'$ leaves the cam 852, the spring 956 restores the cam 852 to the position determined by the position of the lever 950.

Referring now to the operations performed in the proof column or sixth columnar position: If the "Old Balance," when picked up the second time for printing upon the proof tape, is a debit balance, as is usually the case, it is automatically entered in the D totalizer. When, however, the "Old Balance" is a credit amount, manual means is operated to effect the entering of the balance in the A totalizer, when picked up the second time, and printed on the proof tape.

The control element 771F in the sixth columnar position (i. e., the proof position) has a stop $A^2$ (Figs. 2, 3 and 6) which is normally down in position to depress the A totalizer selector 744, but which may be raised into ineffective position. Said control element also has a stop $D^2$ which is normally in ineffective position, but which may be lowered into position to depress the D totalizer selector 741. The stops $A^2$ and $D^2$ are raised and lowered by means of a cam slotted slide $858^z$ (Fig. 6) mounted on one side of the control element for reciprocation longitudinally of said element, a spring 860 normally holding the slide in its rear position. On the rear end of the slide is a lug $z$ for engagement by the cam 852 as the carriage enters the sixth columnar position, to advance the slide $858^z$. The stop $A^2$ is thereby raised into ineffective position, as shown in Fig. 2, while the stop $D^2$ is lowered into position to depress the D totalizer selector 741. Thus, if the "Old Balance" be a debit amount, it is automatically entered in the D totalizer in the ensuing cycle of operations. If, however, the "Old Balance" is a credit amount, the operator, before putting the machine through the cycle of operations, adjusts a mechanism which nullifies the action of the stop $D^2$ and depresses the A totalizer selector 744. This mechanism will now be described.

A slide 959 (Fig. 3) is mounted in the machine frame for vertical reciprocation, said slide having a vertically elongated opening 960 into which the free end of the A totalizer selector 744 extends. When the slide 959 is in its normal position, as shown in Fig. 2, it does not interfere with the operation of the A totalizer selector 744 and permits said selector to occupy its normal inoperative position (as shown in Fig. 2) or to be depressed by the stops A' and $A^2$. When, however, the slide 959 is drawn down into the position shown in Fig. 3, it pulls the A totalizer selector 744 down so as to condition the machine for the use of the A totalizer, even though the stop $A^2$ is ineffective.

A slide 961 is mounted in the framework of the machine for vertical reciprocation adjacent to the slide 959. The slide 961 carries a lug 962 which underlies the D totalizer selector 741. When the slide 961 is in its normal position (as shown in Fig. 2), it lies at the lower limit of travel of the D totalizer selector 741 and does not interfere with the operation thereof by the stops D' and $D^2$. But when the slide 961 is in its upper position (as shown in Fig. 3) it holds the D totalizer selector 741 in its upper ineffective position, the roller 752 (Fig. 4) on the selector 741 yielding to the pressure of the stop $D^2$ (as shown in Fig. 4).

The means for reciprocating the slides 959 and 961 comprises a lever 963 pivoted in the machine frame at 964 and connected at its ends to said slides. The slide-reciprocating means also includes a lever 965 (Fig. 1) pivoted in the machine frame at 966 and connected at its rear end to the forward end of the lever 963. Fixed to the forward end of the lever 965 is a key 967. A spring $967^a$ (Fig. 1) connected to the lever 965 normally holds the key 967 elevated and serves to restore the slides 959 and 961 to their normal positions, as shown in Fig. 2. To hold said key in depressed position and thus hold the slide 961 in its effective upper position against the pressure of the stop $D^2$, and the slide 959 in its effective lower position against the normal tendency of the selector 744 to rise to its home position, I provide a latch 968 (Fig. 1) pivoted at 969 and having a shoulder 970 adapted to engage a stud 971 on the lever 965. A spring 972 normally holds the latch 968 in position to be engaged by said stud. The lower end of the latch extends into position to be engaged by the key-latching and unlatching element 210 described in my said U. S. patent, which element is automatically moved forward at the conclusion of each cycle of operations of the machine to release any of the depressed special keys, and coincidently to disengage the latch 968 from the stud 971.

In operating upon other forms than those herein shown, a stop S (Figs. 6 and 11) may be provided to effect subtraction in the columnar position wherein the "Old Balance" is picked up the second time. With such a set-up, when the "Old Balance" is an "Overdraft" or "Credit Balance," it is necessary to add the "Old Balance" when it is picked up the second time. Hence, I provide on the slide 961 (Fig. 3) a portion 973 adapted to hold the subtraction selector 734 in inoperative position against the action of a subtraction stop S, thus effecting addition of the "Old Balance" in lieu of subtraction.

Reverting to the control element 771C in the "Credit" position: Subtraction should be effected in the cross-footer when a credit is being posted, but the subtraction selector 734 should not be depressed when the "Credit" column is being skipped. Hence, the subtraction stop S (Figs. 6 and 11) is arranged to be lifted into inoperative position by the associated cam slide 858 when said slide is operated to cause column skipping, as shown in Fig. 6.

The machine is automatically put through a cycle of operations at the fourth or spacing cycle position by a stop M (Fig. 11) on the control element 771D, which depresses the selector 748. The machine on such cycle, operates to reset the transfer mechanism of the cross-footer, preparatory to the taking of a total from the cross-footer in the fifth or "New Balance" position. When in that position, the cross-footer is conditioned for the taking of a final total through the action of a stop T (Fig. 11) on the control element 771E on the selector 736; and the machine is automatically cycled to take such total by means of a stop M (Fig. 11) on said control element.

It will be understood that some forms of work may not require automatic transferring of the amount in the cross-footer to one of the auxiliary totalizers in this position of the carriage, and, under such conditions, the stops M and T would be omitted from the control element 771E. The carriage would then stop in the "New Balance" position and the next operation of the machine would be dependent upon depression of the motor bar.

It will further be obvious that the stop M, in the control element 771D, may be dispensed with in the event that a total is not to be taken in the "New Balance" position. Such alternative arrangements are within the scope of the present invention.

When the old balances are being entered in the A totalizer or the D totalizer for proof purposes, the cross-footer is prevented from accumulating such amounts through the operation of the selector 735, said selector being depressed by a stop N (Fig. 11) on the control element 771F.

Line spacing is effected during the latter part of the cycle of operations performed in the sixth columnar position through the depression of the selector 733 by a stop L (Fig. 11).

Inasmuch as the operator may need to depress the Second Pick-up of Credit Balance Key 967 in the sixth columnar position, no motor repeat stop M is provided in that position, the machine being cycled by manual depression of a motor bar (not shown) or equivalent means.

Assuming that the hand lever 950 (Fig. 1) is in the forward or "Charge" position, the operation of posting to a succession of ledger accounts is as follows:

By reference to the journal sheet shown in Fig. 11, it will be noted that in posting to the first ledger sheet, an old debit balance of "100.00" was "picked up" or entered on the ledger sheet, the amount being added into the cross-footer 135 (Fig. 1). The carriage then automatically tabulated to the next or "Charge" column, the lug $w$ passing idly beneath the reversing cam 852. A charge of "10.00" was posted and added simultaneously in the cross-footer 135 and the C totalizer, whereupon the carriage automatically tabulates to the succeeding or Credit column. As the carriage entered the zone of the "Credit" column, the lug $x$ struck the cam 852 and caused the carriage to skip past the Credit column and was arrested in the fourth position. After the machine had automatically gone through a blank cycle of operations at the fourth position to reset any tripped carrying mechanisms, the carriage escaped to the "New Balance" columnar position, where the "New Balance" of "110.00" was printed as a final total from the cross-footer and automatically transferred to the A totalizer, in the manner fully explained in the before-mentioned U. S. patent, at the end of which operation the cross-footer stands at zero. The carriage then automatically continued its advance in column spacing direction to bring the proof tape F to printing position, whereupon the operator picked up the "Old Balance" of "100.00" the second time, by manually depressing the proper numeral keys, and cycled the machine to add the amount in the D totalizer and print it on the tape. The stop N (Fig. 11) in the control element 771F operated the selector 735 to thereby set mechanism which prevented the amount from being accumulated in the cross-footer. The stop L (Fig. 11) controlling the selector 733 effected line spacing, so that the journal sheet and the proof tape are ready for another posting. The ledger sheet (not shown) was then removed and another placed in the machine.

In posting to the second ledger account, an old debit balance of "120.00" was picked up by depression of the proper numeral keys, and added into the cross-footer. There being a "20.00" credit item to post, the operator shifted the lever 950 to the rear or "Credit" position, thereby lowering the cam 852 into the path of the lug $w$, thus causing the charge column to be skipped as heretofore explained. The credit of "20.00" was then posted and simultaneously subtracted on the cross-footer and added in the B totalizer. After a blank cycle in the fourth position, the new balance of "100.00" was printed in the "New Balance" column as a final total from the cross-footer (clearing the cross-footer) and automatically transferred to the A totalizer. On the proof tape, the operator again picked up the "Old Balance" of "120.00," which was added in the D totalizer.

In posting to the third ledger account, an old debit balance of "25.00" was added into the cross-footer, after which a credit of "30.00" was simultaneously subtracted on the cross-footer and added into the B totalizer. The new balance of "5.00" (which is a negative or credit total) was printed as a final total from the cross-footer, clearing the latter, and automatically added to the D totalizer, instead of to the A totalizer, through the operation of the slide 338 (Figs. 1 and 5), link 957, bail 847, slide 851, cam 852, cam slide 858$^y$, stop D', and selector 741. On the proof tape, the operator picked up the old balance of "25.00" and added it in the D totalizer.

The operations performed in posting to the fourth ledger account were similar to those in connection with the first account.

In posting to the fifth ledger account, an old credit balance of "20.00" was picked up and entered subtractively into the cross-footer 135, the Subtraction key (not shown) being operated prior to the depression of the motor bar. A charge of "30.00" was then simultaneously added in the cross-footer and the C totalizer. The carriage then skipped to the blank cycle position, and then escaped to the "New Balance" columnar position, where the machine was automatically cycled to print the new balance of "10.00" as a final total from the cross-footer, the amount being automatically added to the A totalizer. The carriage then escaped to the proof tape position. In arriving at that position, the lug $z$ engaged the cam 852 and the D totalizer selector 741 was depressed, as in the case of the preceding four instances; but since the "Old Balance" was a credit amount, the operator, after setting up the amount in the keyboard, depressed the Second pick-up of credit balance key 967, thus adjusting the slides 959 and 961 into the positions shown in Fig. 3. The result of such adjustment was to pull down the A totalizer selector 744 into operative position and to push the D totalizer selector 741 up into ineffective position, the roller 752 (Fig. 4) yielding with relation to said selector, as shown in Fig. 4. The operator then depressed the motor bar, thus causing the machine to cycle to print the old credit balance of "20.00" on the proof tape and enter the amount additively in the A totalizer. Upon the conclusion of the cycle, the element 210 (Fig. 1) unlatched the key 967, whereupon the spring 967$^a$ restored the key and the slides 959 and 961 to their normal positions.

After completing the series of postings, the operator clears out the rear registers and proves the accuracy of the work in the following manner, reference being had to Fig. 12. The carriage is normalized in the "proof" columnar position.

The operator selects the D totalizer by operating the D-totalizer-selecting key (shown in dotted lines in Fig. 1), as explained in said U. S. patent, and depressing the motor bar, thus putting the machine through a blank cycle of operations, as is required before the taking of a total. In such cycle of operations the D totalizer symbol 975 is printed.

The operator then depresses the Rear register final total key (shown also in dotted lines in Fig. 1) and the motor bar, thus cycling the machine to print the total accumulated in the D totalizer, to wit, "450.00", and the rear register final total symbol 976. This total consists of the old debit balances and the new credit balance of "5.00" that occurred in the third posting. When clearing this total out of the D totalizer it was automatically transferred additively to the cleared cross-footer 135.

The operator then depresses the C-totalizer selecting key (shown in dotted lines in Fig. 1) and the motor bar, thereby putting the machine through a blank cycle, the C totalizer symbol 977 being printed.

The operator then depresses the Rear register final total key and the motor bar, thus cycling the machine to print the total accumulated in the C totalizer, namely, "60.00", and the rear register final total symbol 976. This total consists of the charges, and since this agrees with the pre-ascertained total of the items to be charged, the accuracy of the posting of the charges is proved. In clearing this total from the C totalizer, it was automatically transferred additively to the cross-footer 135 and accumulated with the total of the Old debit and Credit balances previously transferred to the cross-footer, as heretofore explained.

The operator then operates the B-totalizer selecting key (shown in dotted lines in Fig. 1) and the motor bar, thus putting the machine through a blank cycle, the B totalizer symbol 978 being printed.

The operator then operates the Subtraction key and the Rear register final total key, and depresses the motor bar, thereby cycling the machine to print the total of the credits accumulated in the B totalizer, i. e., "50.00", and the rear register final total symbol 976, the total being automatically subtracted from the total of Old debit and Credit balances and the total of Charges accumulated in the cross-footer and amounting, in the example selected to "510.00." Since the total of "50.00" agrees with the total of the credits as determined prior to the posting operations, the accuracy of the posting of credits is proved.

The operator then puts the machine through a blank cycle, preparatory to taking a final total from the cross-footer.

After operating the Cross-footer final total key (shown in dotted lines in Fig. 1), the operator depresses the motor bar, thereby cycling the machine to print the amount "460.00" contained in the cross-footer and the Cross-footer final total symbol 979.

The operator then operates the A-totalizer selecting key (shown in dotted lines in Fig. 1) and the motor bar, thus initiating a blank cycle of operations, the A-totalizer symbol 980 being printed.

The operator then depresses the Rear register final total key and the motor bar, thereby cycling the machine to print the total "460.00" contained in the A totalizer and the CF Non-addition symbol 981. To prevent the total cleared from the A totalizer from being transferred to the cross-footer, the operator depressed the Cross-footer non-addition key (shown in dotted lines in Fig. 1), which accounts for the printing of the non-addition symbol 981.

The amount "460.00" printed as a final total from the A totalizer is the total of all debit new balances, plus the old credit balance of "20.00" that occurred in the fifth posting. Since this amount is the same as the total taken from the cross-footer, the fact that the operator correctly picked up the "Old Balances" is proved, as will be understood from the following explanation:

The old debit balances minus any old credit balances plus charges minus credits equals the new debit balances minus any new credit balances. The charges and credits are accumulated in the C and B totalizers, respectively, for subsequent transfer to the cross-footer. The old debit balances are accumulated in the D totalizer for subsequent transfer to the cross-footer. The old credit balances cannot be accumulated in the C and B totalizers. Nor can the old credit balances be accumulated in the D totalizer, since that totalizer cannot be used for both addition and subtraction. The new debit balances are accumulated in the A totalizer, but the new credit balances cannot be accumulated in that totalizer, since it is not adapted for both addition and subtraction. Hence, I have devised the construction herein disclosed whereby, in the operation of the machine, the old credit balances and the new credit balances are transferred to opposite sides of the equation and their signs changed. In the present embodiment of the invention, this is accomplished by providing mechanism which automatically determines whether new balances shall be accumulated in the A totalizer or the D totalizer, and manually controlled means for determining whether old balances, when picked up the second time, shall be accumulated in the A totalizer or the D totalizer.

It will be evident that the construction herein shown is well adapted to attain the desired results, but it should be understood that the invention is susceptible of embodiment in numerous other forms.

In the set-up illustrated in Fig. 11, there is sufficient space between the control elements to allow the cam 852 to rise and fall as the carriage tabulates. In other possible set-ups such space may not be available, and in some instances the cam may rise while a control element is passing. The spring 851c (Fig. 2) provides a yieldable connection which allows the cam to rise after the control element has passed. This yieldable connection also prevents damage in the event that the operator manipulates the lever 950 while the carriage is in motion.

In the embodiment shown in Figs. 13, 14 and 15, the invention is utilized to effect the printing of credit balances or overdrafts in a special column, in order to render them more conspicuous.

711X is a control element having a tabulating escapement stop 675 and a motor repeat stop M to put the machine through a blank cycle preparatory to the printing of a total.

711Y is a control element which operates the machine to print a debit balance, and 711Z is a control element that effects printing of a credit balance.

The control element 711Y is equipped with an escapement stop 675, a motor repeat stop M, and stops $A^3$ and T to effect the automatic transfer of a final total from the cross-footer 135 to the A totalizer. The slide $858^m$ has a lug $m$ which traverses a path above the cam 852, except when said cam is raised to its highest position due to the presence of a credit balance in the cross-footer. Hence, when the balance is a debit amount, the slide 858^m is not actuated, and the carriage is arrested and the debit total printed and transferred to the A totalizer during a single operation.

The control element 711Z has an escapement stop 675, a motor repeat stop M, and stops $D^3$ and T to cause the automatic transfer of a final total from the cross-footer to the D totalizer.

If the final total in the cross-footer be a debit amount, the cam 852 engages the projection $n$ and operates the slide 858^n to advance the skip cam foot 863 to effective position, and to raise both the stops $D^3$ and M into inoperative position, thus allowing the carriage to escape to the next position.

If, however, when the final total in the cross-footer is a credit balance, the cam 852 engages the lug $m$ of the control element 711Y and actuates the slide 858^m to advance the skip cam foot 863 and render the stops $A^3$ and M inoperative, thereby permitting the carriage to skip from the blank-cycle position to the overdraft column. The extension shoulder $m'$ of the lug $m$ retains the cam 852 in its elevated position from the time it is raised in the blank cycle of operations until the lug $n$ on the control element 711Z has arrived under the cam, whereupon the cam drops upon the lug $n$ without affecting the slide 858^n. Upon arrival of the carriage in the overdraft columnar position, the machine is automatically cycled to print the credit balance and transfer it to the D totalizer.

A specimen of the work is shown in the lower portion of Fig. 13, E being the journal sheet having a debit balance of "100.00" and an overdraft of "5.00" printed thereon.

It will be seen that the construction represented in Figs. 13, 14 and 15 provides for selective use of a plurality of totalizers and selective printing in a plurality of columns.

I believe that I am the first to produce a plural-counter machine having means for automatically selecting the totalizer or totalizers to be used in a given columnar position, so that one totalizer may be used in that position at one time, and another totalizer at another time.

I claim as my invention:

1. A bookkeeping machine having, in combination, a cross tabulating carriage, three totalizers, one of which is adapted for addition and subtraction, and means operating under control of said carriage and sensitive to the character of the total in the last-mentioned totalizer for automatically selecting one of the other totalizers for operation.

2. A bookkeeping machine having, in combination, a cross-tabulating carriage, three totalizers, one of which is adapted for addition and subtraction, and means sensitive to the character of the total in the last-mentioned totalizer and cooperating with the carriage for automatically selecting one of the other totalizers.

3. A bookkeeping machine having, in combination, a cross-tabulating carriage, three totalizers, one of which is adapted for addition and subtraction, the other two being arranged to be selected under control of the carriage, and means sensitive to the character of the total in the addition and subtraction totalizer for automatically determining which one of said two totalizers shall be selected under control of said carriage.

4. A bookkeeping machine having, in combination, a plurality of totalizers, a cross-tabulating carriage, stops on said carriage for a Charge columnar position, a Credit columnar position and a New balance columnar position, means including a cam for adjusting the Charge and Credit stops in accordance with the character of the posting to be performed automatically, means for selecting a certain totalizer for operation in the New balance columnar position, and means which includes said cam and which is sensitive to the character of the new balance as stored in said certain totalizer, for automatically determining which of the other totalizers shall also be selected under control of said carriage for participation in the operation.

5. A bookkeeping machine having, in combination, a plurality of totalizers, a cross-tabulating carriage, stops on said carriage for a Charge columnar position, a Credit columnar position and a New balance columnar position, manual means including a cam for adjusting the Charge and Credit stops in accordance with the character of the posting to be performed, means for automatiaclly selecting a certain totalizer for operation in the New balance columnar position, and means under the control of said certain totalizer and including said cam, for automatically determining which of the other totalizers shall also be selected under control of said carriage for participation in the operation.

6. A bookkeeping machine having, in combination, a cross-tabulating paper carriage provided with stops, a cam for adjusting the stops, a pivoted member arranged to place the cam in various positions, a totalizer, means sensitive to the positive or negative character of the total in the totalizer and connected to said member for positioning the cam, and manually operable means also connected to said member for positioning the cam.

7. A bookkeeping machine having, in combination, two totalizer selectors, a cross-tabulating paper carriage having two stops associated with said selectors, one of said stops being normally effective and the other normally ineffective, and manually operable means for rendering ineffective the normally effective stop and for operating the selector associated with the other stop.

8. A bookkeeping machine having, in combination, two totalizer selectors, a cross-tabulating paper carriage having two stops associated with said selectors, one of said stops being normally ineffective, two slides adapted to engage the two selectors, respectively, to reverse the effect of the corresponding carriage stops, means connecting said slides for reciprocation in opposite directions, and a key and connections for reciprocating the slides.

9. A bookkeeping machine having, in combination, two selectors for controlling functions of the machine, a cross-tabulating paper carriage having stops to operate said selectors, two members adapted to engage the two selectors, respectively, to reverse the effect of the corresponding carriage stops, and means for reciprocating said members in opposite directions.

10. A bookkeeping machine having, in combination, two selectors for controlling functions of the machine, a cross-tabulating paper carriage having stops to operate said selectors, two slides adapted to engage the two selectors, respectively, to reverse the effect of the corresponding carriage stops, means connecting said slides for reciprocation in opposite directions, and a key and connections for reciprocating the slides.

11. A bookkeeping machine having, in combination, a cross-tabulating paper carriage provided with stops, an element for adjusting the stops, manually operable means for moving said element to one position, a totalizer, and means sensitive to the positive or negative character of the total in the totalizer for moving said element to a different position.

12. A bookkeeping machine having, in combination, a laterally shiftable carriage, a totalizer adapted for addition and subtraction, two additional totalizers, means controlled in the lateral movement of said carriage to completely effect selection of one of said additional totalizers in a predetermined position of the carriage, and means sensitive to the character of the total in said addition and subtraction totalizer to cause said carriage to select the second of said additional totalizers in said predetermined position.

13. A bookkeeping machine having, in combination, a cross-tabulating carriage, three totalizers one of which is adapted for addition and subtraction, means under control of said carriage for normally selecting one of two of said totalizers for transfer total operations, and means controlled by said addition subtraction totalizer for automatically preventing carriage selection of said one totalizer and effecting carriage selection of the other of said two totalizers.

14. A bookkeeping machine having, in combination, a plurality of totalizers, a cross tabulating carriage, movable stops on the carriage, totalizer selecting means for operation by said stops, and means under the control of one of the totalizers for automatically moving one of said stops to ineffective position.

15. A bookkeeping machine having, in combination, a plurality of totalizers, a cross tabulating carriage, movable stops on the carriage, totalizer selecting means for operation by said stops, and means under the control of one of the totalizers for simultaneously and automatically moving one stop to ineffective position and a second stop to effective position.

16. A bookkeeping machine having, in combination, a plurality of totalizers, a cross-tabulating carriage, independent totalizer selecting means for operation by said carriage to individually condition certain of said totalizers for operation, and means under the control of one of the totalizers for automatically controlling the action of the carriage, to disable carriage control of one totalizer and enable carriage control of a second totalizer.

17. A bookkeeping machine having, in combination, a plurality of totalizers, a cross-tabulating carriage, stops on said carriage for the Charge columnar position, a Credit columnar position and a New Balance columnar position, means for adjusting the Charge and Credit stops in accordance with the character of the posting to be performed, means under the control of the paper carriage for selecting certain totalizers for a transfer total operation in the New Balance columnar position, and means sensitive to the character of the amount in one of said totalizers for automatically determining which totalizer shall be selected for the transfer total operation under control of said carriage, said last-mentioned means being effective independently of the state of the means for adjusting the Charge and Credit stops.

18. A bookkeeping machine having, in combination, a laterally shiftable carriage arranged for step-by-step movement to effect columnar spacing as an incident to each operation of the machine, a plurality of totalizers, column skipping means, and totalizer selecting means, said two last-mentioned means including a cam arranged for automatic operation under control of one of said totalizers.

19. A bookkeeping machine having, in combination, a totalizer, a plurality of other totalizers, a cross-tabulating carriage, totalizer selecting means associated with said other totalizers and adapted for operation by the carriage, and means under the control of said totalizer for automatically controlling the action of the carriage on the totalizer selecting means associated with the said other totalizers.

20. A bookkeeping machine having, in combination, a totalizer, a plurality of other totalizers, a cross-tabulating carriage, two stops on said carriage, one of which is normally effective and the other normally ineffective, totalizer selecting means associated with said other totalizers and arranged for operation by said stops, and means under the control of said totalizer for automatically disabling the normally effective stop and for enabling the normally ineffective stop.

21. In a bookkeeping machine, a totalizer adapted for addition and subtraction, a plurality of other totalizers, means for entering amounts in said adding and subtracting totalizer, means for controlling the taking of positive totals therefrom, means for controlling the taking of true negative totals therefrom, means for entering these totals in the said other totalizers, means controlled by the add-subtract totalizer according to positive or negative character of the totals therein for determining the totalizer into which the totals are to be entered, and means for causing the operations of amount entering, total taking and total entering to be performed in continuous machine operations.

22. In a bookkeeping machine, a totalizer adapted for addition and subtraction, a plurality of other totalizers, means for entering amounts in said adding and subtracting totalizer, means for controlling the taking of positive totals therefrom, means for controlling the taking of true negative totals therefrom, means for entering these totals in the said other totalizers, means controlled by the positive or negative character of the totals for determining the totalizer into which the total is to be entered, a paper carriage movable to a plurality of tabular positions, and means controlled by the carriage in certain of its positions for causing the operations of total taking and total entering to be performed automatically and in continuous machine operations at the conclusion of an amount entering operation.

23. In a bookkeeping machine, a totalizer adapted for addition and subtraction, a plurality of other totalizers, totalizer actuators, mechanism to engage the totalizers with the actuators, means for entering amounts in said adding and subtracting totalizer, means for controlling the taking of positive totals therefrom, means for controlling the taking of true negative totals therefrom, means for entering these totals in the said other totalizers, means controlled by the positive or negative character of the totals for determining the totalizer into which the total is to be entered, a paper carriage movable to a plurality of tabular positions, and means actuated by the carriage for connecting the determined totalizer with the totalizer engaging mechanism.

24. In a bookkeeping machine, a totalizer adapted for addition and subtraction, a plurality of other totalizers, totalizer actuators, mechanism to engage the totalizers with the actuators, means for entering amounts in said adding and subtracting totalizer, means for controlling the taking of positive totals therefrom, means for controlling the taking of true negative totals therefrom, means for entering these totals in the said other totalizers, means controlled by the positive or negative character of the totals for determining the totalizer into which the total is to be entered, a paper carriage movable to a plurality of tabular positions, means actuated by the carriage for connecting the determined totalizer with the totalizer engaging mechanism, and means controlled by the carriage in certain of its positions for causing the operations of total taking and total entering to be performed automatically and in continuous machine operations at the conclusion of an amount entering operation.

25. A bookkeeping machine having, in combination, a cross-tabulating carriage, two totalizers, actuators therefor, means under the control of the paper carriage for connecting one of said totalizers with its actuators for transfer total operations, and means under the control of the other totalizer for automatically determining whether the first totalizer shall be connected, under control of said carriage, to have the total transferred thereto.

26. A bookkeeping machine having, in combination, a cross-tabulating carriage, three totalizers, actuators therefor, means under the control of the paper carriage for connecting certain of said totalizers with their actuators for transfer total operations, and means under the control of one of the totalizers for automatically determining which of the other totalizers shall be connected, under control of said carriage, to have the total transferred thereto.

27. A bookkeeping machine having, in combination, a cross-tabulating carriage, three totalizers, one of which is adapted for addition and subtraction, actuators for the totalizers, means under the control of the paper carriage for connecting certain of said totalizers with their actuators for transfer total operations, and means sensitive to the character of the total in the addition and subtraction totalizer for automatically determining which of the other totalizers shall be connected, under control of said carriage, to have the total transferred thereto.

28. In a bookkeeping machine, a traveling carriage, a function controlling element thereon, an operating means for the element movable into the path of the element and effective to alter the position of the element as the carriage enters a certain tabular position, and means on the element to retain the operating means in effective position.

29. In a bookkeeping machine, a traveling carriage, a function controlling element thereon, an operating cam for the element movable into the path of the element and effective to alter the position of the element as the carriage enters a certain tabular position, and a shoulder on the element to retain the operating cam in effective position.

30. In a machine of the class described, a totalizer, means, including differential mechanism for entering positive and negative amounts thereon, means for turning the totalizer wheels to zero in one direction when the total thereon is positive and in a different direction when the total thereon is negative, means, controlled by the totalizer according to the positive or negative character of the total thereon, for determining which direction said turning means will turn the totalizer wheels to take a true algebraic total therefrom, means, including the said turning means and the determining means, for controlling the taking of a positive or true negative total during a machine cycle immediately succeeding operation of said determining means, and control means whereby an amount may be entered and a positive or negative total, as controlled by said determining means, may be taken during continuous operation of the machine.

31. In a machine of the class described, a traveling paper carriage, three totalizers, means on the carriage to select one or the other of two of the totalizers, and means under the control of the third totalizer to control the operation of the means on the carriage.

32. In a machine of the class described, a traveling paper carriage, three totalizers, and means, controlled by the carriage in its travel and by one of the said totalizers in accordance with the algebraic state thereof, to select one or the other of the two remaining totalizers.

33. In a bookkeeping machine, a traveling paper carriage, a totalizer adapted for addition and subtraction, another totalizer, means controlled by the carriage for selecting said other totalizer, means for entering amounts in said adding and subtracting totalizer, means for controlling the taking of totals therefrom, means for entering these totals in the said other totalizer, and means, controlled by the add-subtract totalizer according to the positive or negative character of the total therein, for determining whether the said other totalizer shall be selected by the said means controlled by the carriage, to have the total entered therein.

34. In a bookkeeping machine, a traveling paper carriage, a totalizer adapted for addition and subtraction, two other totalizers, means controlled by the carriage for selecting one or the other of said other totalizers, means for entering amounts in said adding and subtracting totalizer, means for controlling the taking of totals therefrom, means for entering these totals in the said other totalizers, and means, controlled by the add-subtract totalizer according to the positive or negative character of the total therein, for determining which of said other totalizers shall be selected by the said means controlled by the carriage, to have the total entered therein.

35. In a bookkeeping machine, a totalizer adapted for addition and subtraction, two other totalizers, means for entering amounts in said adding and subtracting totalizer, means for controlling the taking of a positive or a true negative total therefrom, means, controlled by the add-subtract totalizer according to the positive or negative character of the total therein, for selecting one of the said two totalizers, and means for entering the total in the selected totalizer during the first machine cycle following operation of the selecting means.

36. In a bookkeeping machine, a totalizer adapted for addition and subtraction, a plurality of other totalizers, means for entering an amount in said adding and subtracting totalizer, means for controlling the taking of a positive total therefrom, means for controlling the taking of a true negative total therefrom, means for entering the positive or negative total in the said other totalizer, means, controlled by the add-subtract totalizer according to the positive or negative character of the total therein, for determining the totalizer into which the total is to be entered, and means for causing the operations of amount entering, total taking and total entering to be performed in three continuous machine operations.

37. In a bookkeeping machine, a traveling paper carriage having a new balance columnar position, a totalizer adapted for addition and subtraction, two other totalizers, means controlled by the carriage, when in the new balance columnar position, for selecting one or the other of said other totalizers, means for entering amounts in said adding and subtracting totalizer, means for controlling the taking of totals therefrom, means for entering these totals in the said other totalizers, and means, controlled by the add-subtract totalizer according to the positive or negative character of the total therein, for determining which one of said other totalizers shall be selected by the said means controlled by the carriage, when it is in the new balance columnar position, to have the total entered therein.

OSCAR J. SUNDSTRAND.

CERTIFICATE OF CORRECTION.

Patent No. 2,243,228. May 27, 1941.

OSCAR J. SUNDSTRAND.

It is hereby certified that error appears in the printed specification of the above numbered patent requiring correction as follows: Page 9, second column, lines 6-7, claim 4, strike out "automatically, means for" and insert instead the comma and words --, means for automatically--; and that the said Letters Patent should be read with this correction therein that the same may conform to the record of the case in the Patent Office.

Signed and sealed this 26th day of August, A. D. 1941.

(Seal)

Henry Van Arsdale,
Acting Commissioner of Patents.